(12) United States Patent
Mimassi

(10) Patent No.: US 12,118,503 B2
(45) Date of Patent: *Oct. 15, 2024

(54) DELIVERY DRIVER ROUTING AND ORDER PREPARATION TIMING SYSTEM

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/727,894

(22) Filed: Apr. 25, 2022

(65) Prior Publication Data

US 2022/0318751 A1 Oct. 6, 2022

Related U.S. Application Data

(63) Continuation of application No. 17/223,192, filed on Apr. 6, 2021, now Pat. No. 11,379,789, which is a continuation of application No. 16/898,839, filed on Jun. 11, 2020, now Pat. No. 10,977,606, which is a continuation-in-part of application No. 16/796,505, filed on Feb. 20, 2020, now abandoned.

(60) Provisional application No. 62/938,835, filed on Nov. 21, 2019, provisional application No. 62/938,822, filed on Nov. 21, 2019.

(51) Int. Cl.
| | |
|---|---|
| *G06Q 30/00* | (2023.01) |
| *G06Q 10/0631* | (2023.01) |
| *G06Q 10/08* | (2023.01) |
| *G06Q 10/0835* | (2023.01) |

(52) U.S. Cl.
CPC ......... *G06Q 10/08355* (2013.01); *G06Q 10/063114* (2013.01); *G06Q 10/08* (2013.01)

(58) Field of Classification Search
CPC ......... G06Q 10/08355; G06Q 50/28; G06Q 10/063114
USPC .................................................. 705/16, 347
See application file for complete search history.

(56) References Cited

U.S. PATENT DOCUMENTS

| | | | |
|---|---|---|---|
| 9,625,266 B1 * | 4/2017 | Chintakindi | G01C 21/3484 |
| 10,467,579 B1 | 11/2019 | Reiss et al. | |
| 2005/0027442 A1 * | 2/2005 | Kelley | G01C 21/362 |
| | | | 701/425 |
| 2005/0049940 A1 * | 3/2005 | Tengler | G06Q 20/202 |
| | | | 705/21 |
| 2008/0248815 A1 * | 10/2008 | Busch | H04L 67/52 |
| | | | 455/456.5 |
| 2008/0275643 A1 * | 11/2008 | Yaqub | G01C 21/343 |
| | | | 340/995.19 |

(Continued)

*Primary Examiner* — Rokib Masud
(74) *Attorney, Agent, or Firm* — Galvin Patent Law LLC; Brian R. Galvin

(57) ABSTRACT

A system and method for automated delivery driver routing and order preparation timing. The system is a cloud-based network containing an optimization server, portals for restaurants, customers, and drivers to enter their information, and an optimization engine which determines optimal pickup and delivery times for delivery drivers based on a multitude of variables associated with the business enterprises and delivery driver availability. The system may be accessed through web browsers or purpose-built computer and mobile phone applications.

8 Claims, 14 Drawing Sheets

(56) References Cited

U.S. PATENT DOCUMENTS

2009/0048890 A1* 2/2009 Burgh .............. G06Q 10/06375
 705/7.26
2012/0253892 A1 10/2012 Davidson
2015/0161564 A1 6/2015 Sweeney et al.

* cited by examiner

DELIVERY DRIVER ROUTING AND ORDER PREPARATION TIMING SYSTEM

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/223,192
Ser. No. 16/898,839
Ser. No. 16/796,505
62/938,822
62/938,835

BACKGROUND

Field of the Art

The disclosure relates to the field of computerized selection and routing systems, and more particularly to the field of computerized systems for business selection, ordering, customer routing, and delivery driver routing for retail business establishments.

Discussion of the State of the Art

Travelers frequently wish to stop by a retail business establishment on the way to their destinations. As a very common example, drivers frequently wish to stop for food on the way to their destination, often preferring to order food for take-out that can be consumed at the destination. However, while mobile phones and navigation systems do allow for searching of nearby restaurants the process requires substantial concentration, either requiring a passenger to do the work and coordinate with the driver or requiring the driver to park in order to conduct the searching. The process is cumbersome, and can take a considerable amount of time to complete, matching restaurant names or types to food preferences, or browsing through menus on the driver's mobile device. When performed by the driver while parked, the driver wastes driving time to the destination. Further, there is currently no available system that automatically optimizes the process to account for a variety of customer preferences, including minimizing the delay caused by the re-routing to pick up food, or that coordinates the customer's arrival time at the restaurant with the food preparation time, such that the customer's order is ready when the customer arrives.

With respect to deliveries, there is currently no system that coordinates and optimizes order pickup times, delivery destinations, and driver routing to maximize efficiency, whether for a single business establishment or multiple business establishments that wish to share delivery drivers.

What is needed is a system and method for automated en-route retail business establishment selection, ordering, and routing of both customers and delivery drivers.

SUMMARY

Accordingly, the inventor has conceived and reduced to practice, a system and method for automated delivery driver routing and order preparation timing. The system is a cloud-based network containing an optimization server, portals for restaurants, customers, and drivers to enter their information, and an optimization engine which determines optimal pickup and delivery times for delivery drivers based on a multitude of variables associated with the business enterprises and delivery driver availability. The system may be accessed through web browsers or purpose-built computer and mobile phone applications.

According to a preferred embodiment, a system for automated delivery driver routing and order preparation timing is disclosed, comprising: a business enterprise database comprising a plurality of business enterprise locations, and a good or service provided by at business enterprise location, and a time of order preparation for each good or service; and an optimization engine comprising a first plurality of programming instructions stored in a memory of, and operable on a processor of, a network-connected computing device, wherein the first plurality of programming instructions, when operating on the processor, cause the computing device to: receive availability information from one or more delivery driver mobile devices each associated with a driver, the availability information comprising a driver location, a vehicle type, a vehicle capacity, and routing information for orders currently in the vehicle for delivery, the routing information comprising a delivery location and delivery time; receive order information from one or more business enterprise computing devices for one or more orders, the order information for each order comprising an order identifier and a time that the order was placed; retrieve the business enterprise location and time of order preparation for each order from the business enterprise database; create a data graph from the availability information, the order information, the business enterprise location, and the time of order preparation, the data graph comprising vertices and edges, wherein the vertices represent data points and the edges represent relationships between the data points; analyze the data graph to create a schedule for order preparation, pickup, and delivery of each order; send a pickup request to one or more of the delivery driver mobile devices for each order, the pickup request comprising the order identifier and a time for pickup; and send a preparation start time to the business enterprise computing device, the preparation start time being calculated such that the order is ready at or before the time for pickup.

According to another preferred embodiment, a method for automated delivery driver routing and order preparation timing is disclosed, comprising the steps of: receiving availability information from one or more mobile devices each associated with a delivery driver, the availability information comprising a driver location, a vehicle type, a vehicle capacity, and routing information for orders currently in the vehicle for delivery, the routing information comprising a delivery location and delivery time; receiving order information from one or more business enterprise computing devices for one or more orders, the order information for each order comprising an order identifier and a time that the order was placed; retrieving business enterprise location and time of order preparation for each order from a business enterprise database; creating a data graph from the availability information, the order information, the business enterprise location, and the time of order preparation, the data graph comprising vertices and edges, wherein the vertices represent data points and the edges represent relationships between the data points; analyzing the data graph to create a schedule for order preparation, pickup, and delivery of each order; sending a pickup request to one or more of the delivery driver mobile devices for each order, the pickup request comprising the order identifier and a time for pickup; and sending a preparation start time to the business enterprise computing device, the preparation start time being calculated such that the order is ready at or before the time for pickup.

According to an aspect of an embodiment, the availability information further comprises hours of availability of each driver.

According to an aspect of an embodiment, the availability information further comprises one or more areas of operation of each driver.

According to an aspect of an embodiment, a traffic data retriever is used to: retrieve traffic data from the Internet; and add the traffic data to the data graph.

According to an aspect of an embodiment, a map data retriever is used to: retrieve map data from the Internet or from a database; determine a route for pick up or delivery.

According to an aspect of an embodiment, the schedule is optimized based on optimization selected from the following list: minimum time from pickup to delivery of each order; average time from pickup to delivery of a group of orders; shortest distance traveled by each driver; average distance traveled by a group of drivers; earliest pickup time of each order; average pickup time of a group of orders; earliest delivery time of each order; average delivery time of a group of orders; and maximization of number of deliveries made without another pickup.

According to an aspect of an embodiment, the data graph is a weighted graph.

According to an aspect of an embodiment, the data graph is a directed graph.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
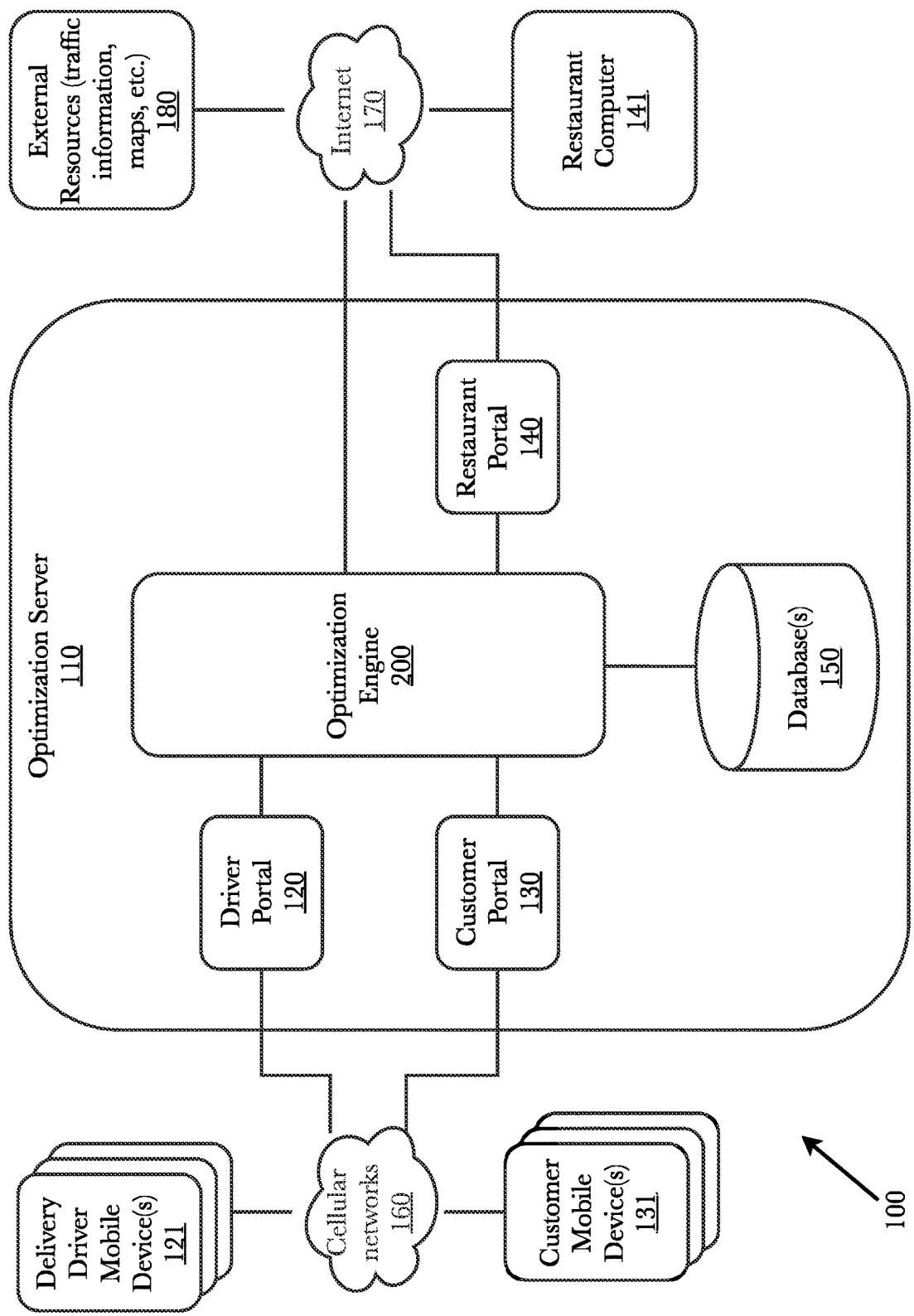
FIG. 1 is a block diagram illustrating an exemplary system architecture for an automated en-route business establishment selection, ordering, and routing system.

The inventor has conceived, and reduced to practice, a system and method for automated delivery driver routing and order preparation timing. The system is a cloud-based network containing an optimization server, portals for restaurants, customers, and drivers to enter their information, and an optimization engine which determines optimal pickup and delivery times for delivery drivers based on a multitude of variables associated with the business enterprises and delivery driver availability. The system may be accessed through web browsers or purpose-built computer and mobile phone applications.

It is frequently the case that a driver wishes to stop to pick up food on the way to his or her destination. Very often, the driver wishes to minimize the impact on the trip by avoiding long time delays or long detours from the intended route. However, accomplishing this task using currently-available tools is difficult. The driver could select a restaurant by chance, usually by seeing a sign for a restaurant while driving. Alternately, the driver could try to find a restaurant by searching using a mobile device. Doing so while driving is dangerous because the driver must direct his or her attention away from the road for significant periods of time and perform tasks that require concentration. At a minimum, the driver first has to open a mapping application, search for nearby restaurants, and select a restaurant by clicking on it on the map. However, in doing so, the decision is, again, based largely on chance, as the driver is forced to make a restaurant selection from restaurants shown in the nearby area and based only on the restaurant name, which may or may not indicate a type of cuisine (e.g., Barbeque, Mexican food, Chinese food, etc.). If the driver wishes to get additional information, such as menu options, pricing, etc., the driver is forced to stop in order to be able to devote sufficient concentration to the task of clicking on restaurant websites, opening up menus, or calling the restaurant for more information. All of these methods involve substantial driver distraction, and all are inefficient. None of them takes into account a myriad of factors that may affect the customer's decision such as the customer's preferences in suggesting restaurants, delays associated with the detour to the restaurant, delays associated with food preparation times at the restaurant, or the time from pickup to arrival at the customer's destination (which may cause hot food to grow cold).

The invention is particularly useful to commuters and those on business trips, where maintaining a planned arrival time is important. Efficiency in restaurant selection, ordering, food preparation time, pickup time, and minimization of delays due to re-routing become critical, especially where traffic can cause unexpected additional delays. As will be further disclosed herein, the invention makes a multi-variate analysis of a large variety of factors (customer preferences; restaurant location, menu options, and food preparation times; traffic data; etc.) to allow a driver or other user to quickly and easily make an en-route restaurant selection and order food items the customer prefers, all with a minimum of distraction and disruption to travel.

While the use case of drivers searching for takeout food while en-route to a destination is a primary example used herein, it is important to note that the invention is not so limited, and may be used by any person (e.g., passengers in a vehicle, persons on public transportation, pedestrians, etc.) seeking to purchase goods or services at any retail business establishment (i.e., the invention is not limited to restaurants, and can be applied to any retail goods or services). In some embodiments, single or multiple delivery driver routing may be optimized for a single business establishment. In other embodiments, delivery driver routing may be optimized for one or more delivery drivers shared by multiple business establishments.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a delivery-based business. Many examples herein use a restaurant as the business establishment, but the invention is not limited to use in restaurants, and is applicable to any business establishment.

Conceptual Architecture

FIG. 1 is a block diagram illustrating an exemplary system architecture 100 for an automated en-route business establishment selection, ordering, and routing system. In this embodiment which uses a restaurant as the business establishment, the system comprises an optimization server 110, a driver portal 120, a customer portal, a restaurant portal, a database, and an optimization engine. Delivery driver mobile devices 121 may connect to the driver portal 120, typically via a cellular phone network 160, although connections may be made through other means, as well, such as through the Internet 170 (e.g., through a WiFi router). Customer mobile devices 131 may likewise connect to the customer portal 130 via a cellular phone network 160, the Internet 170, or other network connection. Restaurant computers 141 (which do not necessarily need to be mobile, as they are located as the restaurant location) may connect to the restaurant portal 140, typically through an Internet 170 connection, although other network connections may be used.

In the use case of a customer en-route to a destination, customers will connect to the customer portal 130 to pre-enter a variety of preferences and other information that will be stored in a database 150, and used by the optimization engine 200 to suggest restaurants, menu items, and routing options that meet the customer's preferences. Examples of the types of preferences that a customer may enter include, but are not limited to: food preferences such as types of food, frequency with which preferred foods are eaten, ranking of particular foods relative to other foods, customer inconvenience preferences such as time delays and routing distances, time after pickup before eating (to ensure that food is still hot when arriving at the customer's destination), food attributes such as price, calories, ingredients, and side dishes. In some embodiments, certain of these preferences will be determined by the system. For example, the types of food preferred by the customer and the frequency with which preferred foods are eaten may be determined based on the customer's history of usage as stored in a database 150 in the system. Other such preferences and factors may also be determined by the system.

Likewise, restaurants may connect to the restaurant portal 140 to enter information about the restaurant and its menu. Examples of the types of information that a restaurant may enter include, but are not limited to: restaurant name, location, types of food offered, hours of operation, phone number, specific menu offerings, food preparation times for certain dishes (including adjustments to food preparation times during busy periods for the restaurant), prices, calorie counts, ingredients, side dishes, drinks, and special pricing options like daily "happy hour" specials or seasonal offerings. In some embodiments, the system may be able to determine certain restaurant information by accessing external resources 180 such as mapping websites and applications. For example, the system may access a publicly-available mapping website such as Google maps, which may contain information about the restaurant's name, location, types of food offered, hours of operation, phone number, etc. Thus, in some embodiments, it is not necessary for the restaurant to enter certain information through the portal, as the information may be automatically obtained from external resources 180.

When a customer mobile device 131 connects to the optimization server 110 and the customer requests en-route restaurant selection assistance, the optimization engine 200 retrieves the customer's preferences from a database 150. The customer may further enter a destination or select a pre-entered destination presented from the customer's preferences, which will allow the system to better customize its suggestions. The optimization engine 200 then determines the customer's location by querying the customer's mobile device for location information (e.g., provided by the mobile device's GPS hardware, WiFi location applications, etc.) and gathers information from external resources 180 about restaurant options located nearby and along the route from the customer's currently location to the customer's destination, as well as traffic information related to the customer's location, intended route, and identified restaurant options. The optimization engine 200 retrieves additional information from a database about identified restaurant options, if such information is available. Based on the customer preferences, restaurant information, and traffic information, the optimization engine 200 identifies one or more restaurants and one or more food options available at those restaurants that are compatible with the customer's preferences, and presents the identified restaurants and their corresponding food options to the customer on the customer's mobile device 131 as suggestions along with indications of the additional delay that will be caused by choosing each suggestion. Thus, the driver is freed of the bulk of the distracting work of finding available restaurants, and can simply select an option presented by the optimization engine 200, knowing that the option will be compatible with his or her preferences and that the delay time will be acceptable. In some embodiments, an application on the customer's mobile device 131 may dial the phone number of the chosen restaurant for the customer to place the order. In some embodiments, the optimization server 110 will contact the restaurant through the restaurant portal 140 to automatically enter an order into the restaurant's computer 141, or to direct an employee of the restaurant to call the customer's mobile device 131, or to establish a voice connection between the restaurant and the customer's mobile device 131 through another means (e.g., voice over internet protocol, or VOIP).

In some embodiments, the optimization engine 200, through the restaurant portal 140, may also provide information to the restaurant to schedule the restaurant's food preparation activities to coordinate with the customer's arrival. If the restaurant has entered information such as food preparation times, the optimization engine 200 may use that information to instruct the restaurant's kitchen staff when to start preparation of the customer's order, such that the order will be ready just prior to arrival of the customer. Such food preparation times and scheduling may be adjusted for busy periods at the restaurant (typically around lunch and dinner) either automatically based on the restaurant's history as stored in a database 150, or by retrieving information stored in a database 150 that has been manually entered by the restaurant through the restaurant portal 140.

In the use case of delivery driver routing, drivers will connect to the driver portal 120 to pre-enter a variety of preferences and other information that will be stored in a database 150, and used by the optimization engine 200 to suggest pickup times, routes, and scheduling of deliveries. Delivery drivers may be employed by a single restaurant, employed on a shared basis among multiple restaurants, or may be freelance drivers who make themselves available through the system to any restaurant requiring delivery services. Examples of the types of preferences and information that a delivery driver may enter include, but are not limited to: hours of availability, geographical area served by the driver, type of vehicle, and vehicle capacity. The optimization engine 200 tracks driver location, number of orders in the vehicle currently in delivery, traffic information, order availability and location of participating restaurants, and the preferences and information entered by the driver to optimize pick ups, deliveries, and routing among one or more delivery drivers. As just one example of optimization, a driver on a scooter may only be able to carry a single order and may be further away from the restaurant than a driver in a car, but because of the scooter's small size and maneuverability the optimization engine may select the scooter over the car to make certain deliveries faster. In some embodiments, certain parameters will be determined by the system. For example, the optimization engine may recognize from historical information in a database of drivers that scooters, on average, save a certain number of minutes in delivery along certain routes, or that a particular driver is faster than others.

Figure 2:
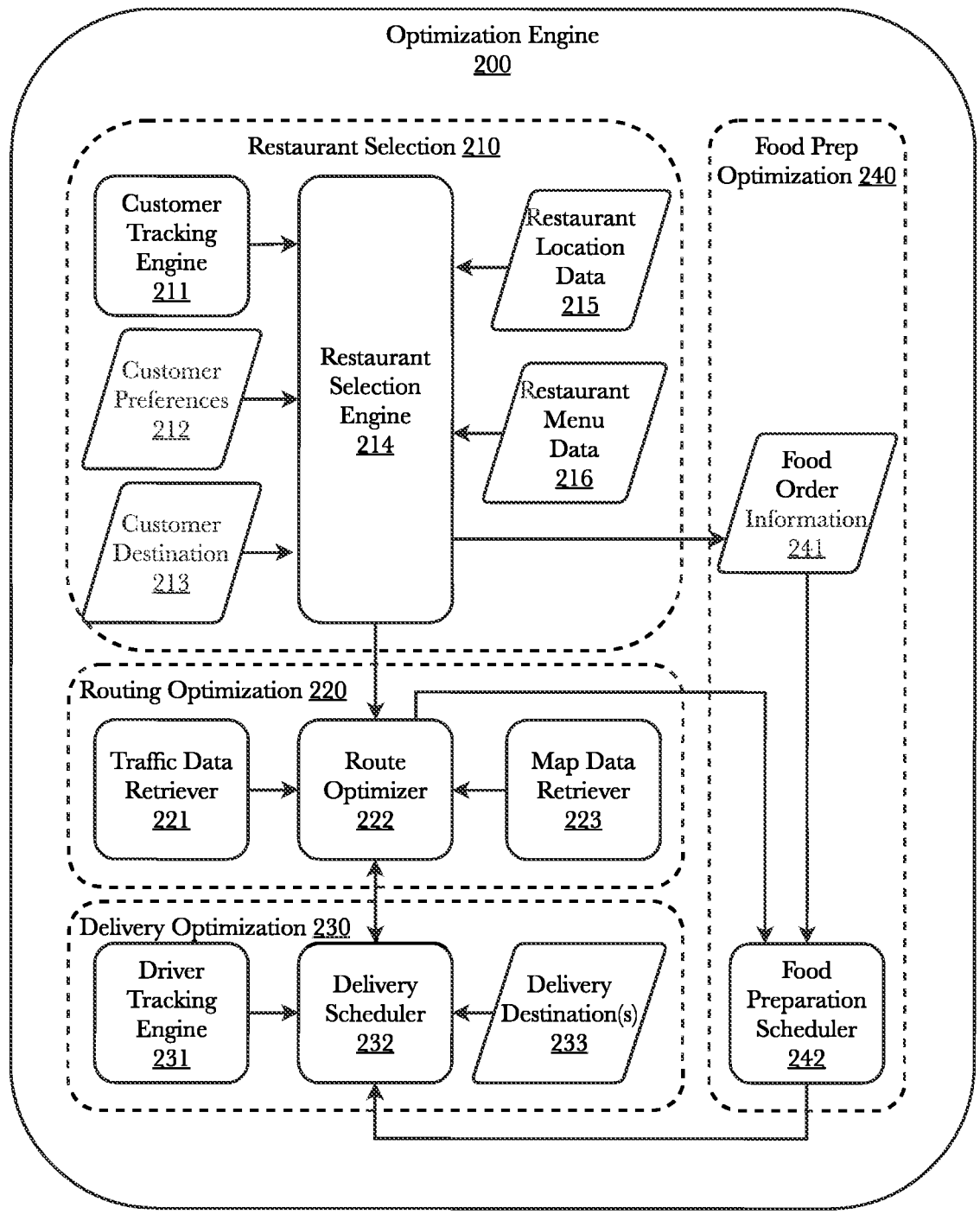
FIG. 2 is a block diagram illustrating an exemplary architecture for an aspect of an automated en-route business establishment selection, ordering, and routing system, the optimization engine.

FIG. 2 is a block diagram illustrating an exemplary architecture for an aspect of an automated en-route business establishment selection, ordering, and routing system, the optimization engine 200. In this embodiment, the optimization engine 200 comprises several subsystems, a restaurant selection subsystem 210, a routing optimization subsystem 220, a delivery optimization subsystem 230, and a food preparation optimization subsystem 240. The restaurant selection subsystem comprises a customer tracking engine 211 and a restaurant selection engine 214. The customer tracking engine 211 keeps track of the customer's current location by querying the customer's mobile device 131 for location information. The customer preferences 212, restaurant location data 215, and restaurant menu data 216 may be retrieved from a database 150 or, in some embodiments, obtained from external resources 180. The customer's destination 213 will typically be indicated by the customer using an application on his or her mobile device 131.

The routing optimization subsystem comprises a route optimizer 222, a traffic data retriever 221, and a map data retriever 223. The traffic data retriever 221 obtains current traffic information from external sources 180, while the map data retriever 223 may either obtain map data from a database 150 or from external resources 180.

The delivery optimization subsystem 230 comprises a driver tracking engine 231, and a delivery scheduler 232, and may receive as input delivery destinations 233. The customer preferences database contains a variety of pre-entered or pre-determined information about the customer's preferences.

The food preparation optimization subsystem 240 comprises a food preparation scheduler 242, which receives as input food order information 241 comprising a customer's order. A food preparation scheduler 242 may allow for input provided manually or automatically through an Internet-Of-Things ("IOT") piece of cookware, such as a stove or microwave or other appliance, to track the progression of an order, such as cook time or status of the cooking or packaging of an order, or it may estimate based on a pre-determined time estimation for different food items to be prepared.

A food preparation scheduler 242, in concert with a route optimizer 222 and delivery scheduler 232, may provide for automated or manual, or partially-manual, updates on a delivery's status, during the food preparation, the food pickup, and the food delivery, through any combination of IOT food preparation appliances and systems, manual input from cooks and chefs or other restaurant or kitchen staff, pre-stored time estimates for food preparation time, route optimization and scheduling based on traffic data and driver data, and delivery timing based on driver performance, route selection, traffic data, and any manually input data from a driver such as unexpected delays, as necessary.

In operation, when a customer has requested restaurant selection assistance the restaurant selection engine 214 receives the customer's current location from the customer tracking engine 211 and the customer's destination 213. The restaurant selection engine 214 obtains restaurant location data 215 and restaurant menu data 216 for one or more restaurants either from a database 150 or from external resources 180. The restaurant selection engine 214 then uses optimization algorithms to determine which restaurants offer food items compatible with the customer's preferences, and which minimize the inconvenience to the customer of making a detour to the restaurant to pick up the food. The restaurant selection engine 214 presents recommendations to the customer about restaurants and food items meeting the customer's preferences and allows the customer to select an option on his or her mobile device 131 by simply selecting an option (on a touch-based mobile device interface, for example, the customer would simply touch on one of the presented options with his or her finger). The restaurant optimization engine 214 then sends the information about the selected restaurant to a route optimizer 222, which obtains traffic data from the traffic data retriever 221 and map data from the map data retriever 223, and calculates an optimal route. Simultaneously, the restaurant selection engine 214 sends food order information 241 to a food preparation scheduler 242 (which may be running on the optimization server 110 or on the restaurant's computer 141), which calculates a food preparation start time determined by comparing the food's preparation time as retrieved from a database 150 with the customer's expected arrival time as determined by the route optimizer 222.

In some embodiments, the optimization engine may have a delivery optimization subsystem 230, in which a delivery scheduler 232 receives food pickup times from the food preparation scheduler 242, restaurant locations and routing information from the route optimizer 222, delivery destination information 233, and the current location of the driver from the driver tracking engine 231. Based on that information, the delivery scheduler may choose an available driver to deliver the order most efficiently (e.g., shortest time from order readiness to arrival at the delivery destination).

Note that this example is simplified for clarity, and that the actual optimization engine 200 will address a much broader set of factors and variables, as described elsewhere herein. The optimization engine may use any number of optimization algorithms, including machine learning algorithms, to find optimal solutions to the large number of variables presented.

Detailed Description of Exemplary Aspects

Figure 3:
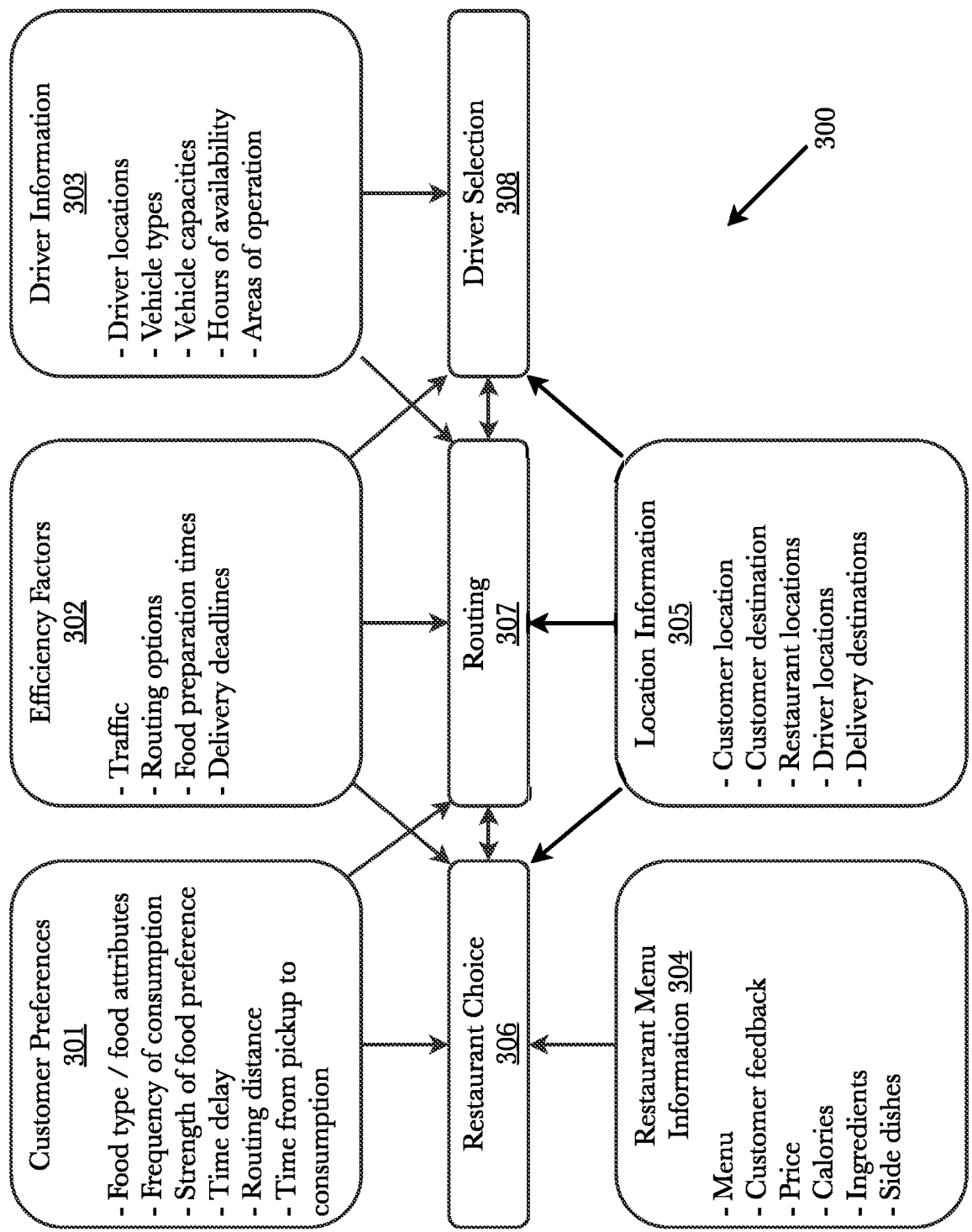
FIG. 3 is a diagram illustrating an exemplary optimization variables and the decisions they may impact.

FIG. 3 is a diagram illustrating an exemplary optimization variables and the decisions they may impact 300. Customer preferences 301 (e.g., food preferences and routing/delay preferences) will impact both restaurant choice and routing decisions. Efficiency factors 302 (e.g., traffic, routing, food preparation times, and delivery deadlines) will impact all three decisions, restaurant choice 306, routing 307, and where applicable, driver selection 308. Delivery driver information 303 (e.g., driver locations, vehicle types, vehicle capacities, hours of availability, area of operation) will impact routing decisions 307 and driver selection 308. Restaurant menu information 304 (e.g., menu, customer feedback, price, calories, ingredients, side dishes) will impact primarily restaurant choice. Location information 305 (e.g., location of customer, customer destination, locations of restaurants, locations of drivers, and delivery destinations) will impact all three decisions, restaurant choice 306, routing 307, and where applicable, driver selection 308. Adding complexity to the analysis, restaurant choice 306 can impact routing choices 307, and vice-versa. Likewise, routing choices 307 may impact driver selection 308, and vice-versa.

"Altogether, these references seem to support the claim but not very directly. I see the data being used to determine best restaurant choices, but I don't see specific reference to analysis being used to create a schedule for order prep, pickup & delivery."

Figure 4:
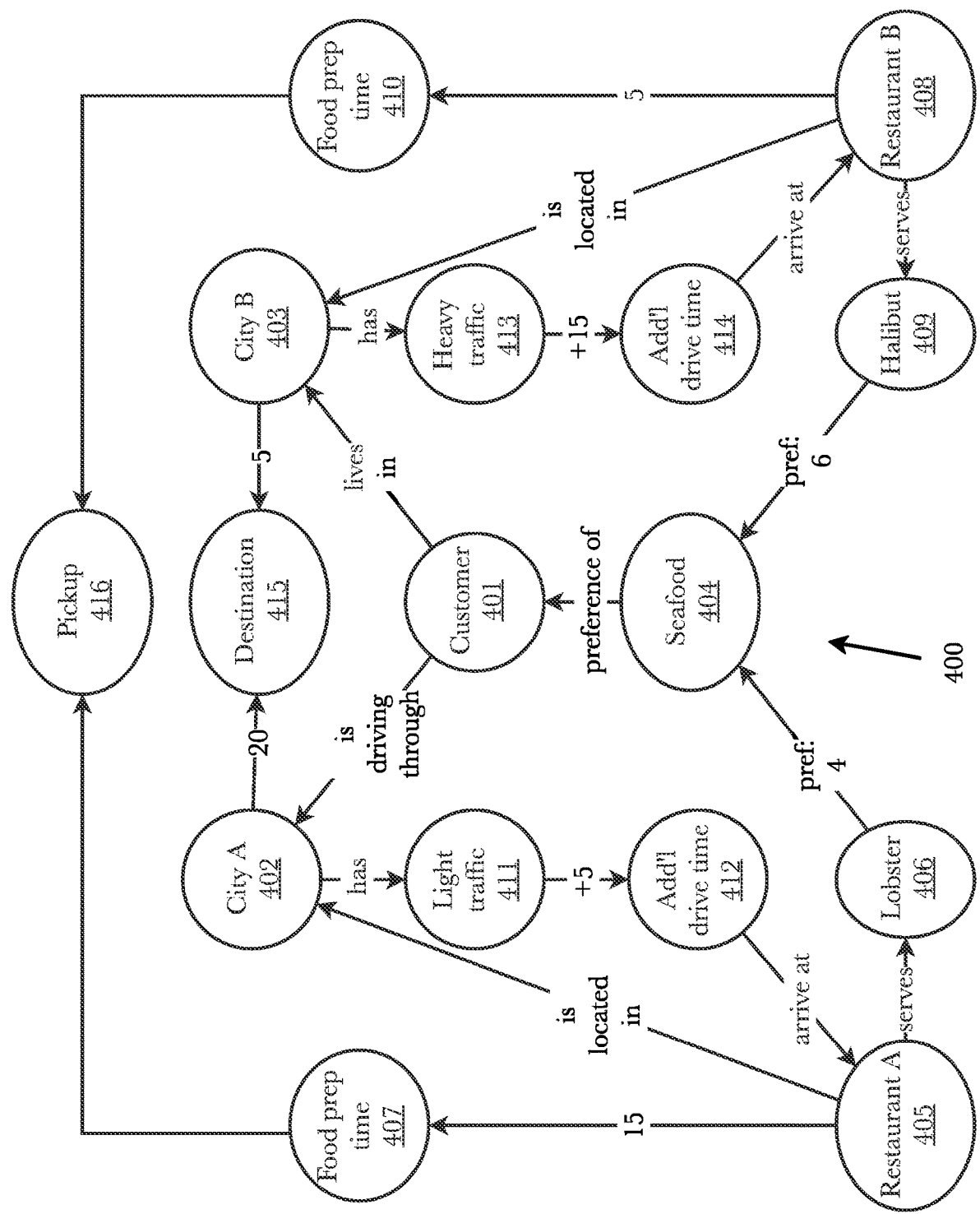
FIG. 4 is a diagram illustrating an exemplary weighted, directed graph of a type which may be used to optimize the multi-variate problem of optimizing en-route restaurant selection, ordering, and routing.

FIG. 4 is a diagram illustrating an exemplary weighted, directed graph 400 of a type which may be used to optimize the multi-variate problem of optimizing en-route restaurant selection, ordering, and routing. One approach to solving multi-variate problems such as the coordination of customer preferences with locations and menu options is the use of data graphs to represent the totality of factors and their relationships, and apply one of a number of optimization algorithms to the graph to determine the shortest path or least-cost path. In a data graph, the nodes (also called vertices) of the graph represent data points, and the edges (lines between the nodes) represent relationships between the nodes. Data graphs may be directed or undirected, weighted or unweighted, and cyclical or acyclical. A directed graph contains edges that have a direction from one node to another, whereas undirected graphs contain edges that do not have a direction. A weighted graph has edges to which a value is assigned, whereas unweighted graphs do not have values assigned to their edges. Cyclical graphs contain at least one group of nodes through which a path may be repeated, whereas acyclical graphs do not contain any repeatable paths.

In this example, which is simplified for clarity, a weighted, directional graph is shown which contains relationships between the customer's location, the customer's preferences, the location of two restaurants, the type of food the restaurants serve, and the delays from order to pickup and from pickup to consumption. The customer 401 lives in City B 403, but is driving through City A 402. City A has light traffic 411, which would result in 5 minutes of additional drive time 412, whereas City B has heavy traffic 413, which would result in 15 minutes of additional drive time 414. Restaurant A 405 is located in City A 402, which is nearer to the customer's current location 401, whereas Restaurant B 408 is located in City B 403, which is further from the customer's 401 current location, but closer to the customer's 401 destination (assuming that the customer is driving home). Both restaurants serve a type of seafood 404 which is a preference of the customer 401, but Restaurant A 405 serves lobster 406, which is more preferred by the customer (preference value 4, with lower numbers being more preferred) than the halibut 409 (preference value 6, with lower numbers being more preferred) offered by Restaurant B 408.

The choice of restaurants may be determined by performing one or more weighted path calculations to determine the least cost path between certain nodes. For example, the least cost path between the restaurants and the customer 401 is the path between Restaurant A and the customer (preference value 4), indicating that Restaurant A 405 would be a preferred food choice. The least cost path between the customer and pickup 416 through Restaurant A 405 is through City A 402 which has light traffic 411, resulting in 5 additional minutes of drive time, but with a food prep time 407 of 15 minutes (meaning that the customer will have to wait at the restaurant for 10 minutes after arriving), resulting in a total time from order to pickup 416 of 15 minutes. The least cost path between the customer and pickup 416 through Restaurant B 405 is through City B 403 which has heavy traffic 413, resulting in 15 additional minutes of drive time, and with a food prep time 410 of 15 minutes, also resulting in a total time from order to pickup 416 of 15 minutes. So, the total time from order to pickup 416 is the same for both restaurants, despite the additional time in heavy traffic for Restaurant B 408. Lastly, the time from pickup 416 to consumption is analyzed. The least cost path from City A 402 to the destination 415 is 20 minutes, while the least cost path from City B 403 to the destination 415 is 5 minutes. Thus, Restaurant A 405 has a slightly preferred food, but will cause 15 minutes of delay to the travel time and the time from pickup 416 to consumption is much longer. Restaurant B 408 has an acceptable food, and will also cause 15 minutes of delay to the travel time, but the time from pickup 416 to consumption is much shorter, so the food will be hot on arrival at the destination. Based on this analysis Restaurant B 408 would likely be identified as preferable by the system, and would be presented to the customer over Restaurant A 405. However, in a real-world scenario, there could be dozens of restaurants located in multiple cities along the customer's route, so this analysis would be greatly expanded. Certain choices would be eliminated entirely and other choices would be more obviously preferable.

Various methods for determining shortest path in a data graph are known in the art, including the Bellman—Ford Algorithm for determining the single shortest distance in O(#vertices times # of edges) time. For a graph with no negative weights, the single source shortest distance can be calculated using Dijkstra's algorithm in O(# of edges plus (#vertices times log (#vertices)) time using Dijkstra's algorithm. Other shortest path and least cost algorithms are known in the art and may be applied.

Alternatively, machine learning algorithms may be used to optimize the variables without creating a data graph in advance. Such algorithms may construct their own data graphs or other representations of the data, and continually optimize the outcomes either through multiple repetitions or through refinement of historical choices.

Figure 5:
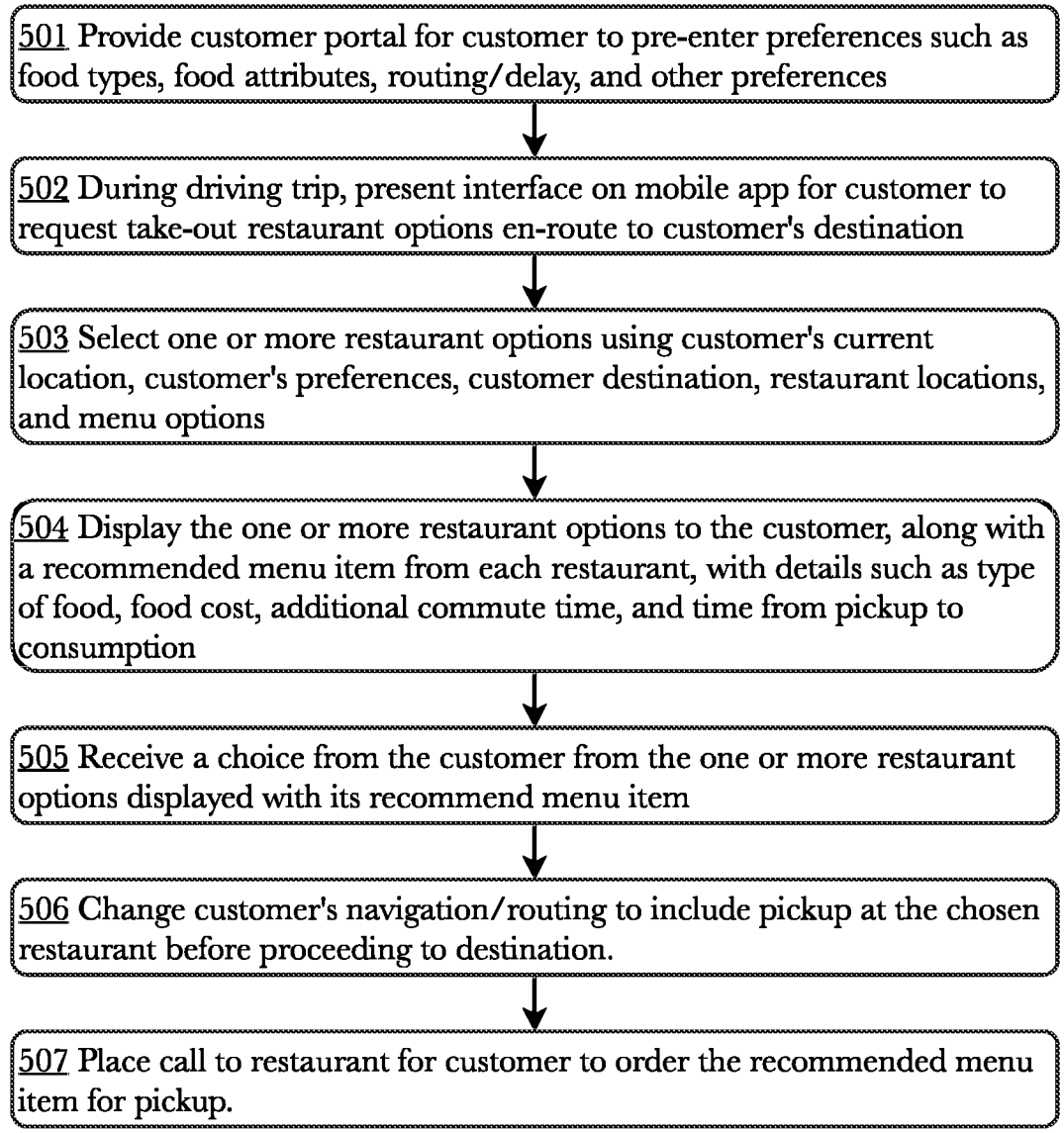
FIG. 5 is a flow diagram showing the steps of an exemplary method for en-route restaurant selection, food ordering, routing, and pickup by a customer.

FIG. 5 is a flow diagram showing the steps of an exemplary method for en-route restaurant selection, food ordering, routing, and pickup by a customer. A customer portal is provided for the customer to pre-enter preferences such as food types, food attributes, routing/delay, and other preferences 501. During driving trip, the customer is presented with interface on mobile app for customer to request takeout restaurant options en-route to customer's destination 502. One or more restaurant options are selected using customer's current location, customer's preferences, customer destination, restaurant locations, and menu options 503. The restaurant options are displayed to the customer, along with a recommended menu item from each restaurant, with details such as type of food, food cost, additional commute time, and time from pickup to consumption 504. A choice is received from the customer from the one or more restaurant options displayed with its recommend menu item 505. The customer's navigation/routing is changed to include pickup at the chosen restaurant before proceeding to destination 506. Finally, a call is placed to the restaurant for customer to order the recommended menu item for pickup 507.

Figure 6:
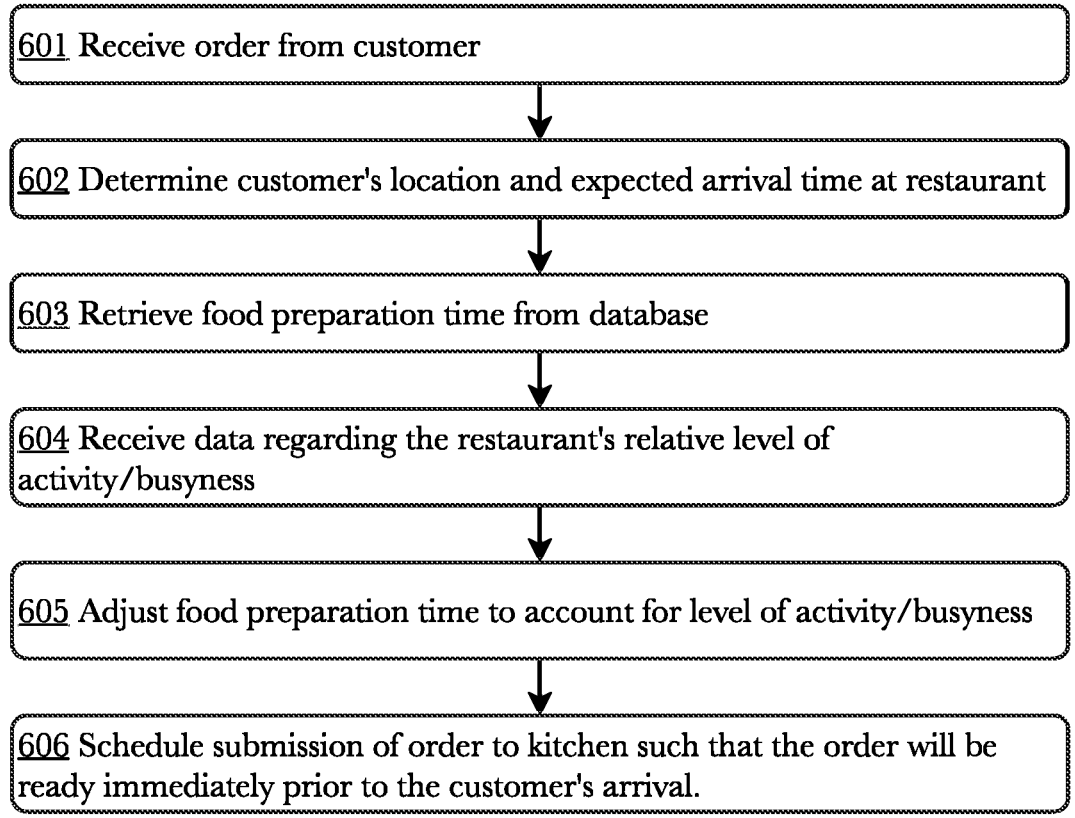
FIG. 6 is a flow diagram showing the steps of an exemplary method for restaurant food preparation optimization based on a customer's order, expected arrival time, and the restaurant's current activity level.

FIG. 6 is a flow diagram showing the steps of an exemplary method for restaurant food preparation optimization based on a customer's order, expected arrival time, and the restaurant's current activity level. The restaurant receives an order from a customer 601. The customer's current location and expected time of arrival are determined 602, which determination may take into account traffic and other factors. A food preparation time for the customer's order is retrieved from a database 603. The restaurant's relative level of activity is determined (i.e., how busy is the restaurant?) 604, and the food preparation time is adjusted to account for the level of activity 605. Submission of the order to the kitchen is scheduled such that the order will be ready immediately prior to the customer's arrival 606.

Figure 7:
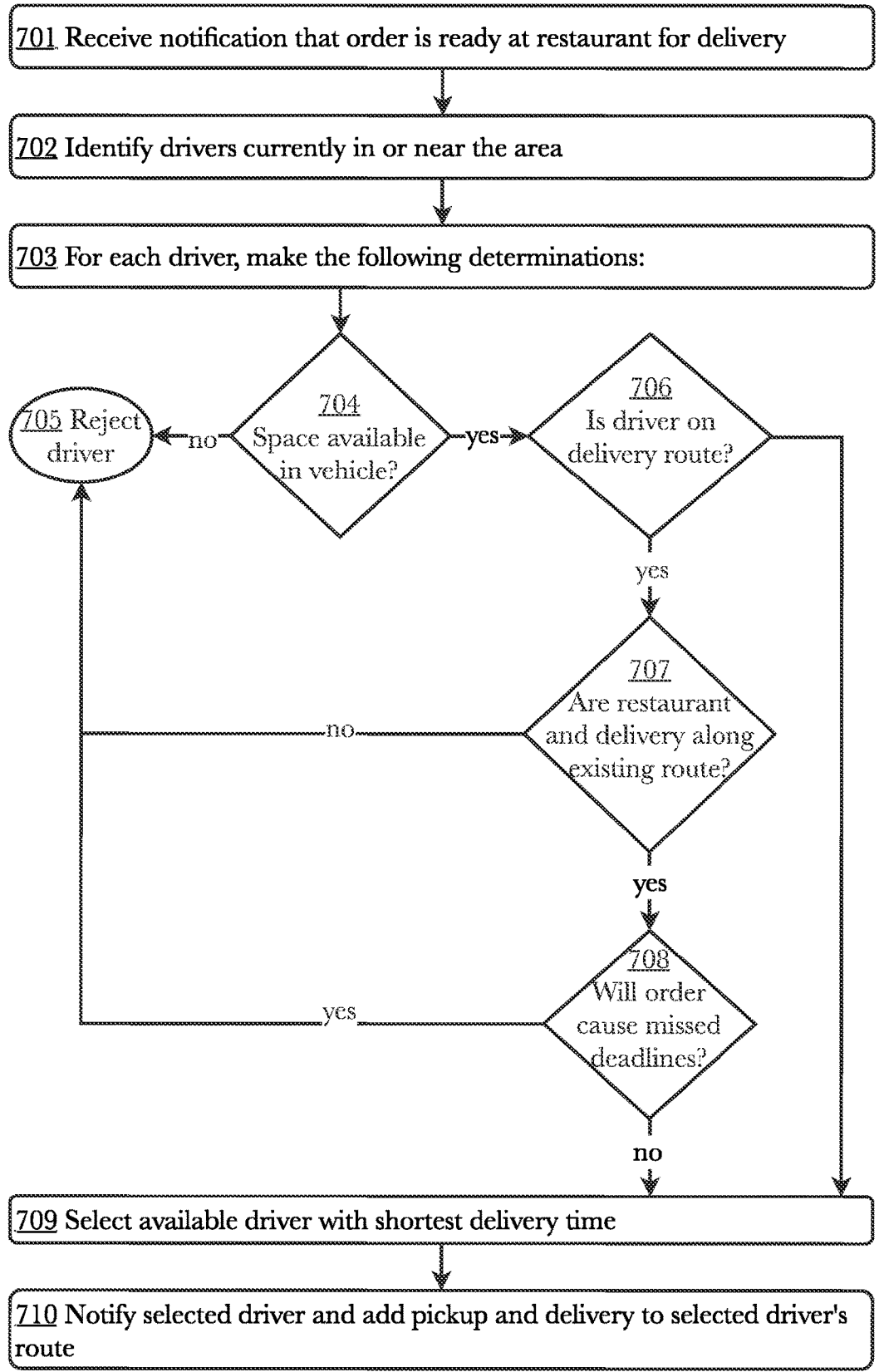
FIG. 7 is a flow diagram showing the steps of an exemplary method for optimization of delivery driver routing for multiple restaurants sharing multiple drivers.

FIG. 7 is a flow diagram showing the steps of an exemplary method for optimization of delivery driver routing for multiple restaurants sharing multiple drivers. Notification is received that an order is ready for pickup and delivery at a participating restaurant 701. Drivers currently in or near the area are identified 702. For each driver, a series of determinations is made 703. First, the space available in the driver's vehicle is checked based on the number of orders the driver has picked up but not delivered and the capacity of the driver's vehicle 704. If there is insufficient space, that driver is rejected 705. Otherwise, a determination is made as to whether the driver is currently making a delivery 706. If not, the driver is added to the list of potential drivers for step 709. If the driver is currently making a delivery, a determination is made as to whether the restaurant and delivery are along (or near) the driver's current delivery route 707. If not, the driver is rejected 705. If they are, a final check is made to determine whether adding the pickup and delivery to the driver's current delivery route will cause the driver to miss any deadlines 708. If yes, the driver is rejected 705. Otherwise, the driver is added to the list of potential drivers for step 709. At step 709, a driver is selected from the list of potential drivers, the selection being based, in this example, on the shortest delivery time, although other options are possible. Finally, the selected driver is notified, and the pickup and delivery are added to the driver's route 710. Note that the pickup and delivery do not have to be added to the end of the driver's route, and can be inserted between other deliveries, if that results in a more efficient overall route.

Figure 8:
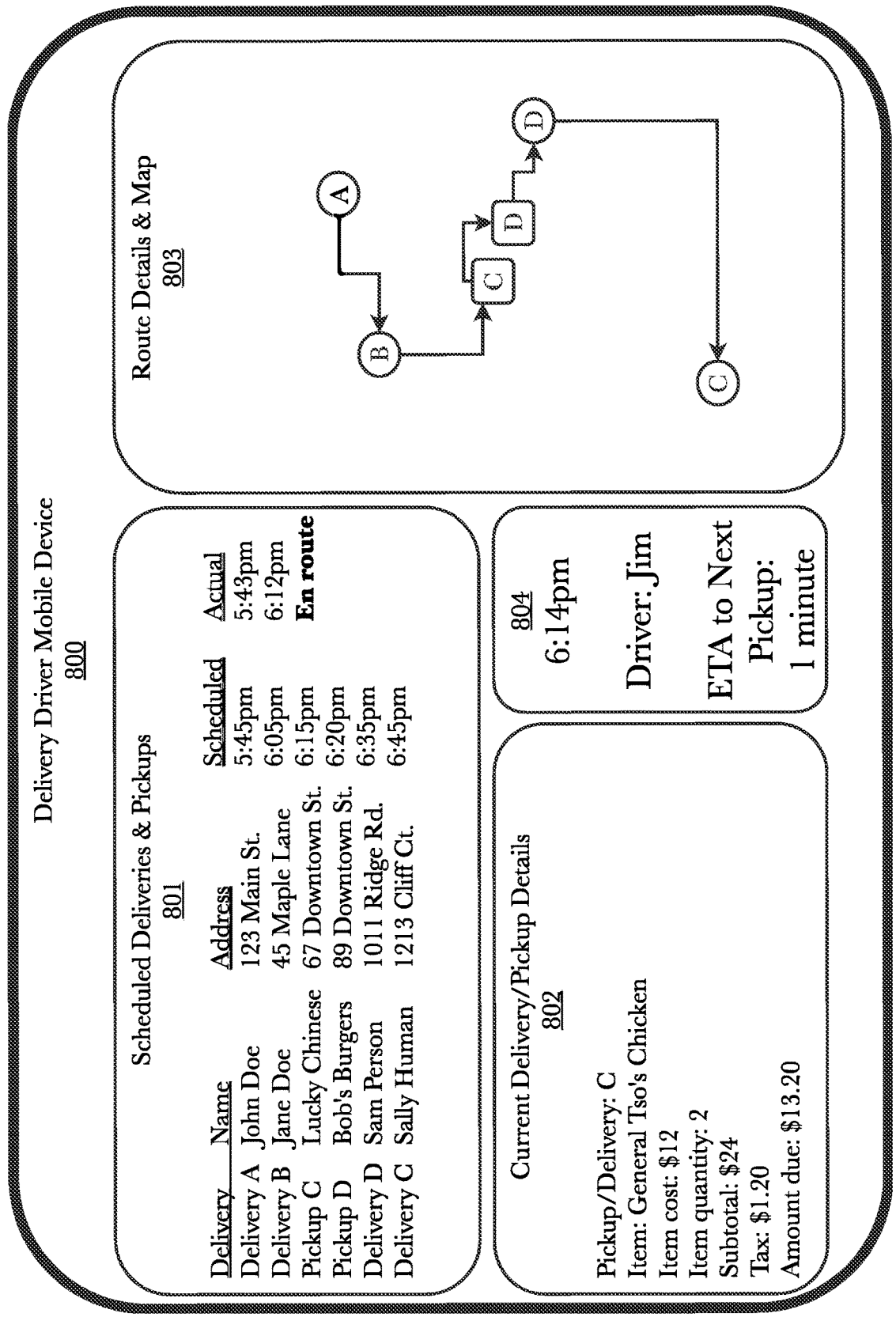
FIG. 8 is a diagram showing an exemplary screenshot of the display on a delivery driver mobile device for routing of pickups and deliveries.

FIG. 8 is a diagram showing an exemplary screenshot of the display on a delivery driver mobile device for routing of pickups and deliveries. The display of a delivery driver mobile device 800 is designed to facilitate pickups and deliveries that have been optimized by the optimization server 110. A variety of information may be shown to on the delivery driver mobile device 800, and multiple screens may be used to convey information to the driver. In this example, four screen areas provide information to the driver, a scheduled deliveries and pickups window 801, a current delivery/pickup details window 802, a route details and map window 803, and a time and estimated time of arrival window 804. The scheduled deliveries and pickups window 801 shows a time-ordered list of the pickups and deliveries to be made by the driver, including information such as the delivery number or identifier, the name of the person to whom the delivery is to be made, the delivery address, the scheduled delivery time, and the actual delivery time, as well as an indication of the delivery to which the driver is en route. The current delivery/pickup details window 802, shows details regarding the current delivery or pickup to which the driver is en route, including information such as the delivery number or identifier, the item to be delivered, the item cost, the item quantity, the subtotal, tax, and the amount due. The amount due may be collected by the driver by cash, credit, or a pre-paid account, and entered into the system on another screen (not shown). The driver may be further assisted in pickups and deliveries by a navigation system similar to the route details and map window 803. This window shows an aerial view of the geographical area in which the driver's pickups and deliveries are to be made, and the route to be taken by the driver. In this example, the driver has already made Delivery A at location A shown on the map, and delivery B at location B shown on the map. The driver is now en route to restaurant C for a pickup, and then will proceed directly to restaurant D for a pickup for the following reasons: restaurant D is closer to restaurant C than location C, the order at restaurant D will be ready immediately upon the driver's arrival, and location D is on the way to location C. Delivery D will be made at location D after the pickup from restaurant D, and on the way to delivering delivery C to location C. This example represents one possible optimization of routing based on minimized driver travel distance, but many other optimizations are possible, including minimum time from pickup to delivery of each order, average time from pickup to delivery of a group of orders, shortest distance traveled by each driver, average distance traveled by a group of drivers, earliest pickup time of each order, average pickup time of a group of orders; earliest delivery time of each order, and average delivery time of a group of orders, and maximization of number of deliveries made without another pickup (depending on vehicle capacity). The availability and routes of other drivers may be taken into account, as well. For example, if two orders are available at a given restaurant at the same time, one driver may pick up one of the orders, and leave the second order for a different driver who may arrive later, but is going on a better route to deliver the second order more quickly. The time and estimated time of arrival window 804 shows other useful information to the driver such as the current time, confirmation of the driver's name (to ensure that the driver is not following another driver's route), and the estimated time of arrival at the next pickup or delivery location.

Figure 9:
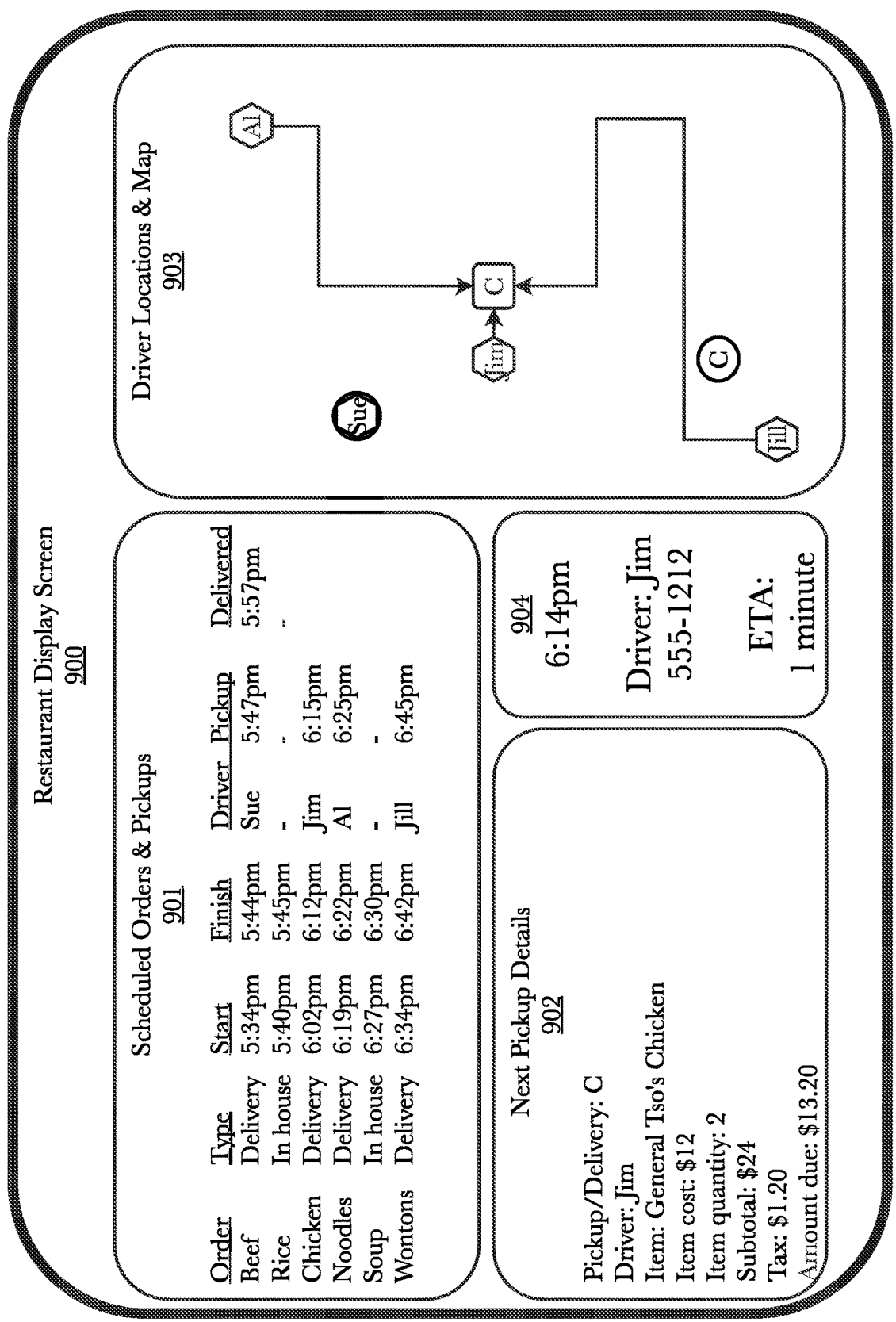
FIG. 9 is a diagram showing an exemplary screenshot of a restaurant display screen showing kitchen preparation optimization for driver pickups.

FIG. 9 is a diagram showing an exemplary screenshot of a restaurant display screen showing kitchen preparation optimization for driver pickups. In this example, the information shown relates to the Lucky Chinese restaurant shown in pickup C and driver Jim of FIG. 8. The restaurant display screen 900 is designed to coordinate food preparation times with pickup times that have been optimized by the optimization server 110. Multiple such screens may be located in different locations around the restaurant, and different screens may show different information. For example, some screens may be optimized to show the kitchen staff order and prep times, while some screens (as in this example) may be optimized to show a take-out manager scheduled orders, the time of the next pickup, and the driver's current location. In this example, four screen areas provide information to the take-out manager, a scheduled orders and pickups window 901, a next pickup details window 902, a driver locations and map window 903, and a time and estimated time of arrival window 904. The scheduled orders and pickups window 901 shows a time-ordered listing of food orders to be prepared by the kitchen staff, including information such as the menu item to be prepared, whether the order is for in house consumption (dine-in) or delivery (take out), the start time that the kitchen needs to start preparation for the order to be ready when the delivery driver arrives, the estimated order completion time either, the driver scheduled to pickup and deliver the order, the estimated pickup time, and the time the order was delivered. The next pickup details window 902, shows details regarding the next pickup to be made by a driver, including information such as the delivery number or identifier, the driver name, the item to be picked up, the item cost, the item quantity, the subtotal, tax, and the amount due. The amount due may be collected by the driver by cash, credit, or a pre-paid account, and entered into the system through a screen (not shown) on the delivery driver mobile device 800. The take-out manager may monitor the location of drivers using a navigation system similar to the driver locations and map window 903. This window shows an aerial view of the geographical area in which the restaurant's deliveries are to be made, the locations of the deliveries, and the locations and routes of available drivers. In this example, driver Sue has completed a delivery at 5:57 pm, but does not have another delivery scheduled for this restaurant. Driver Jim is just about to arrive at the restaurant to pick up Delivery C, which is an order for chicken. The order has just completed preparation by the kitchen at 6:12, and Jim is scheduled to arrive at the restaurant to pick up the order in one minute (at 6:15 pm). Jim will deliver the order to location C. As shown in the related example from FIG. 8, Jim will stop at restaurant D and deliver order D first, but this is not shown in the screen of restaurant C. Driver A1 is en route to restaurant C to pick up an order of noodles at 6:25 pm, and driver Jill is en route to the restaurant to pick up an order of wontons at 6:42 pm. Delivery driver scheduling and routing may be optimized based on any number of factors, including minimum time from pickup to delivery of each order, average time from pickup to delivery of a group of orders, shortest distance traveled by each driver, average distance traveled by a group of drivers, earliest pickup time of each order, average pickup time of a group of orders; earliest delivery time of each order, and average delivery time of a group of orders, and maximization of number of deliveries made without another pickup (depending on vehicle capacity). Kitchen preparation start times would be coordinated automatically with the optimization, and the preparation finish times of other restaurants may be taken into account, as well. The availability and routes of other drivers may also be taken into account. For example, if two orders are available at a given restaurant at the same time, one driver may pick up one of the orders, and leave the second order for a different driver who may arrive later, but is going on a better route to deliver the second order more quickly. The time and estimated time of arrival window 904 shows other useful information to the take-out manager such as the current time, the name of the driver making the next pickup and the driver's phone number (to allow the take-out manager to easily contact the driver, if necessary), and the estimated time of arrival of the driver for the next pickup.

Figure 10:
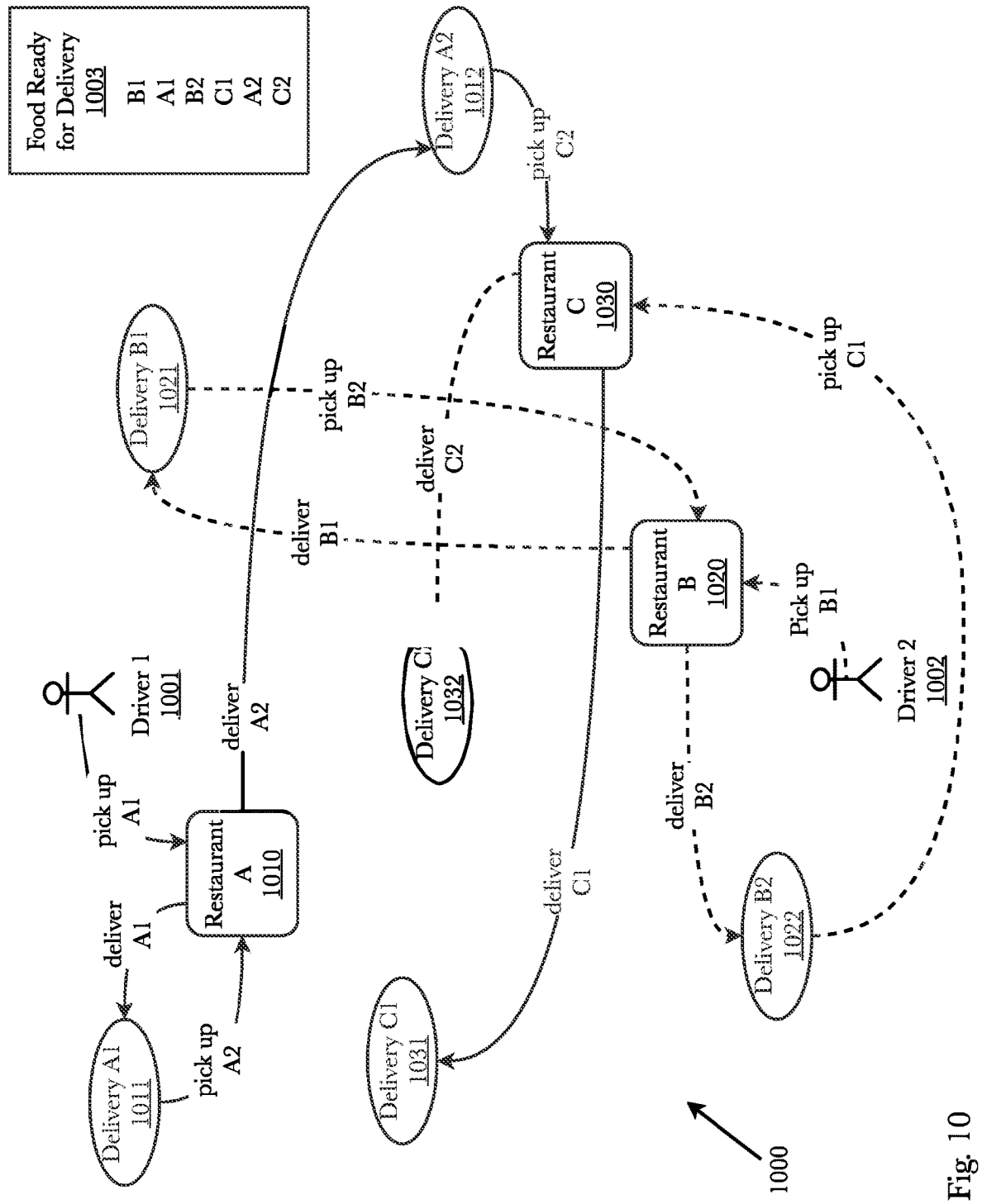
FIG. 10 is a routing diagram showing an exemplary routing of two drivers for pickup and delivery of 6 orders from 3 restaurants.

FIG. 10 is a routing diagram showing an exemplary routing 1000 of two drivers for pickup and delivery of 6 orders from 3 restaurants. In this example, there is a driver1 1001 (solid line), a driver2 1002 (dashed line), a restaurant A 1010 with two orders 1011, 1012, a restaurant B 1020 with two orders 1021, 1022, and a restaurant C 1030 with two orders 1031, 1032. The orders are ready for pickup and delivery in the order shown in 1003. As order B1 becomes ready, it is picked up by driver 2 1002, who is nearby to restaurant B 1020, and then delivered immediately to delivery location B1 1021. Order A1 becomes ready for pickup, and is picked up by Driver 1 1001, who is nearby to restaurant A 1010, and then delivered immediately to delivery location A1 1011. However, since driver 1 is far away from restaurants B 1020 and C 1030, driver 1 1001 is instructed to wait and pick up order A2, which will be ready after orders B2 and C1. Driver 2 picks up order B2 from restaurant B 1020, delivers it to delivery location B2 1022, then proceeds to restaurant C 1030 to pick up order C1 for delivery to location C1 1031 which is located far away from restaurant C 1030, so it's inefficient for driver 2 1002 to return to restaurant C 1030 to pick up order C2. As order A2 becomes available, driver 1 1001 picks up order A2 from restaurant A 1010, and delivers it to delivery location A2, which is located nearby restaurant C 1030, so driver 1 1001 then proceeds to restaurant C 1030 to pick up order C2 and deliver it to delivery location C2 1032. In this example, routing is optimized to minimize the time from pickup to delivery of each item. Delivery driver scheduling and routing may be optimized based on any number of factors, including minimum time from pickup to delivery of each order, average time from pickup to delivery of a group of orders, shortest distance traveled by each driver, average distance traveled by a group of drivers, earliest pickup time of each order, average pickup time of a group of orders; earliest delivery time of each order, and average delivery time of a group of orders, and maximization of number of deliveries made without another pickup (depending on vehicle capacity). Kitchen preparation start times would be coordinated automatically with the optimization and, as in this example, the preparation finish times of other restaurants may be taken into account, as well. As in this example, the availability and routes of other drivers may also be taken into account. For example, if two orders are available at a given restaurant at the same time, one driver may pick up one of the orders, and leave the second order for a different driver who may arrive later, but is going on a better route to deliver the second order more quickly.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
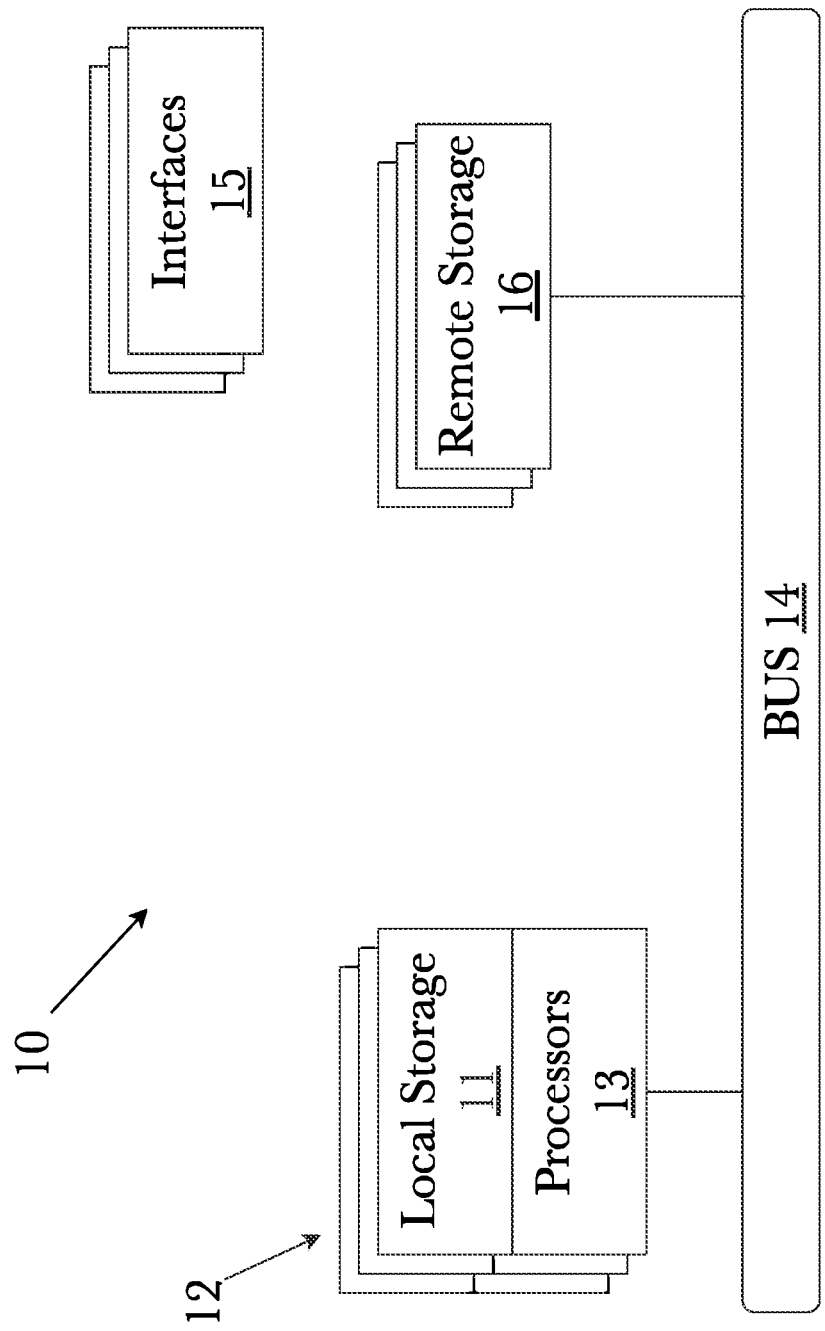
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices. As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
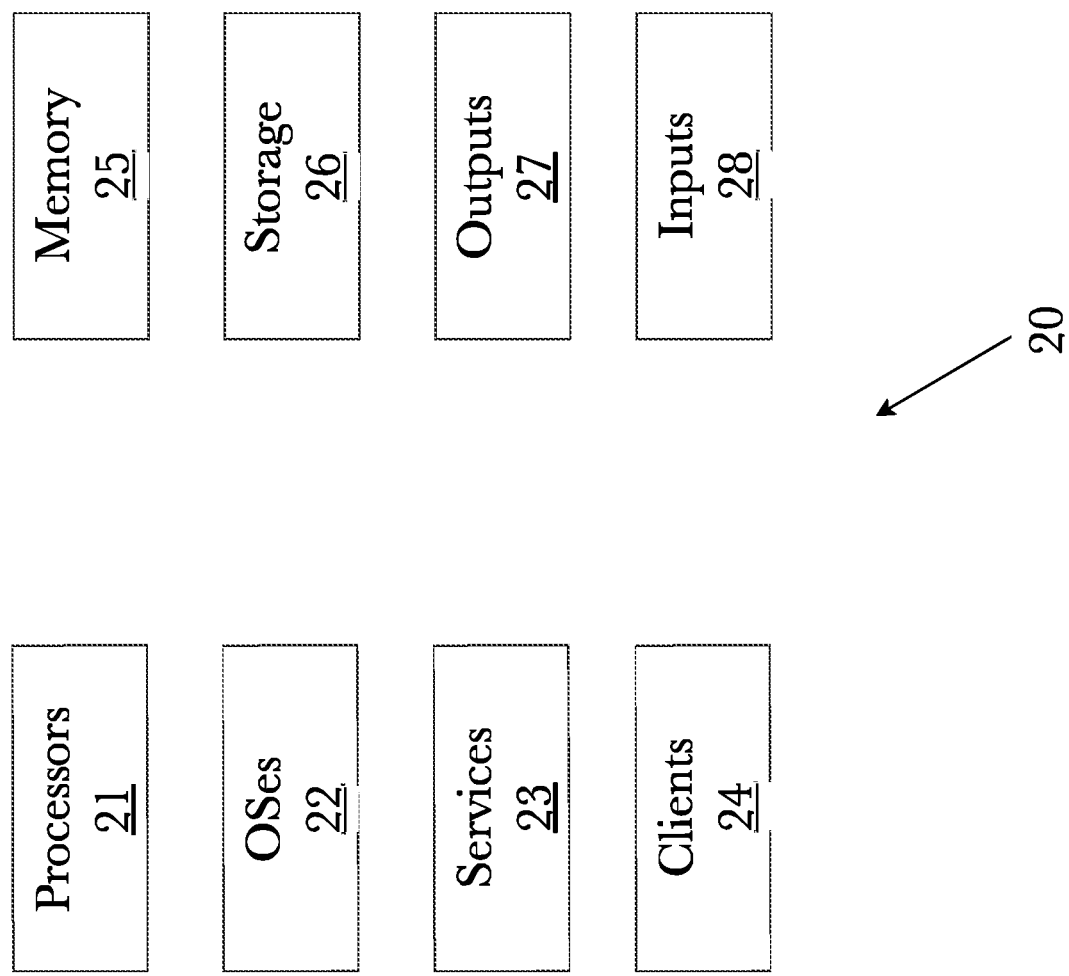
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
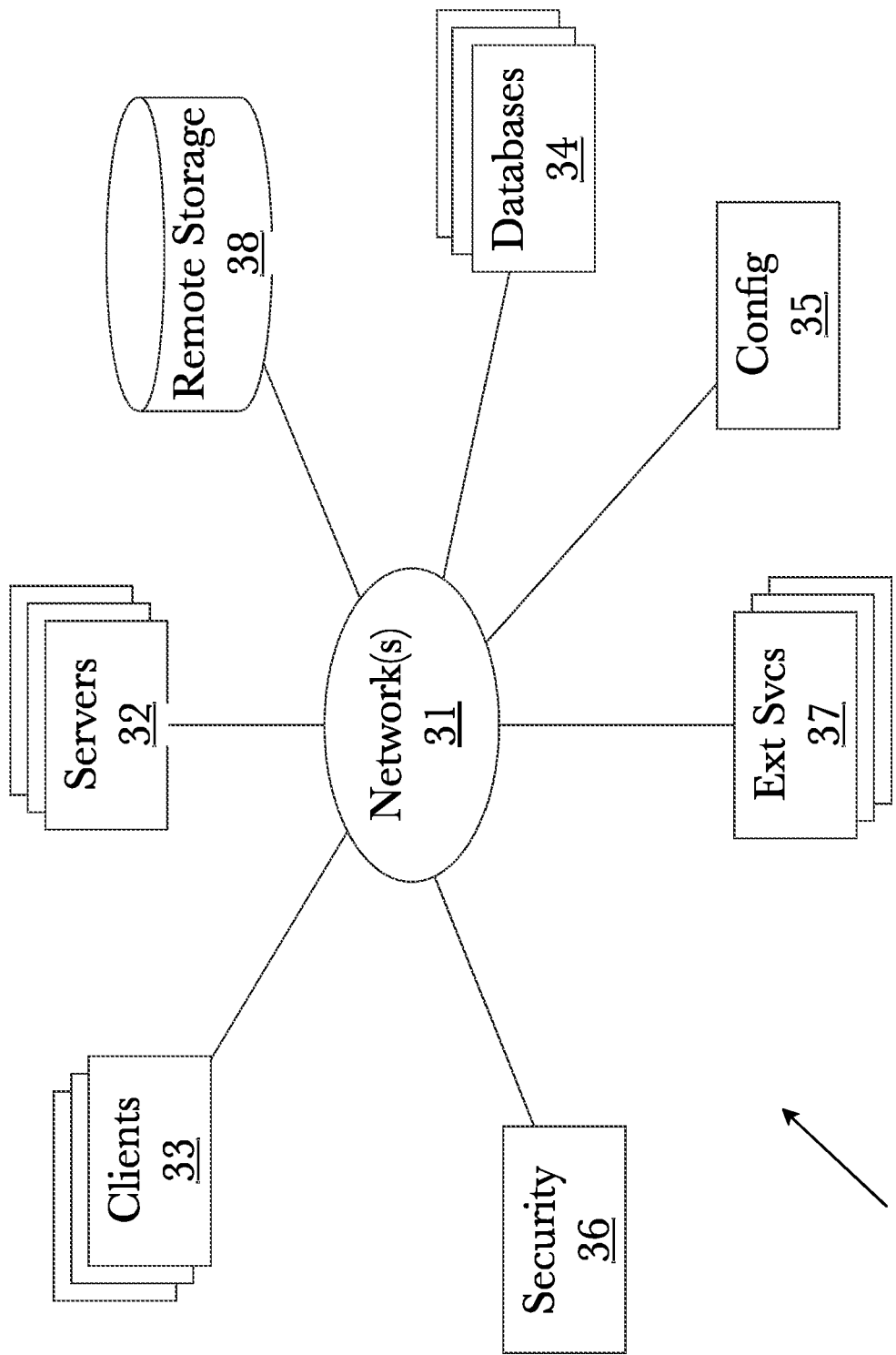
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
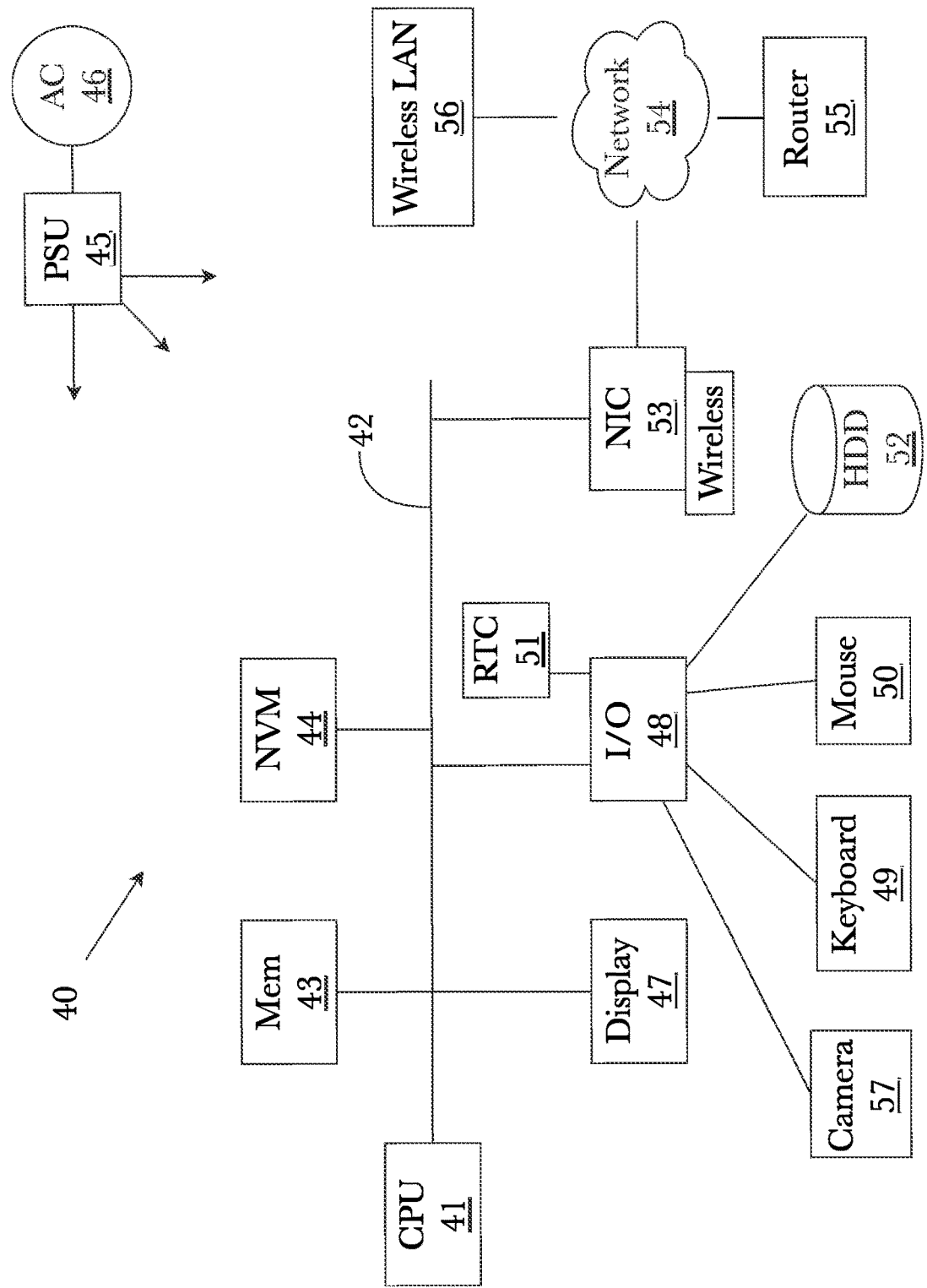
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated delivery driver routing and order preparation timing, comprising:
   A computing system comprising a plurality of processors; and
   an optimization subsystem comprising a plurality of programming instructions that, when operating on a processor of the plurality of processors, cause the computing system to:
      receive availability information from a mobile device associated with a delivery driver, the availability information comprising a driver location, and a vehicle capacity;
      receive routing information from one or more mobile devices each associated with a driver of a vehicle for orders currently in each respective vehicle for delivery, the routing information comprising one or more delivery locations and delivery times;
      receive order information from one or more business enterprise computing devices for one or more orders, the order information for each order comprising a predicted order preparation time for each order and a time that the order was placed;
      create a data graph from the routing information; the availability information, and the order information, the data graph comprising vertices and edges, wherein the vertices represent data points and the edges represent relationships between the data points;
      analyze the data graph to create a schedule for order preparation, pickup, and delivery of each order;
      send a pickup request to one or more of the vehicle driver mobile devices for each order, each pickup request comprising an order identifier, a delivery location, and a time for pickup; and
      send a preparation start time to a corresponding business enterprise computing device, the preparation start time being calculated so that the order is ready at or before the time for pickup.

2. The system of claim 1, wherein the routing information further comprises hours of availability of each driver.

3. The system of claim 1, wherein the routing information further comprises one or more areas of operation of each driver.

4. The system of claim 1, further comprising a traffic data retriever comprising a second plurality of programming instructions stored in a memory of, and operable on a processor of, a network-connected computing device, wherein the second plurality of programming instructions, when operating on the processor, cause the computing device to:
   retrieve traffic data from the Internet; and
   add the traffic data to the data graph.

5. The system of claim 1, further comprising a map data retriever comprising a third plurality of programming instructions stored in a memory of, and operable on a processor of, a network-connected computing device, wherein the third plurality of programming instructions, when operating on the processor, cause the computing device to:
   retrieve map data from the Internet or from a database;
   determine a route for pick up or delivery of an order; and
   send the route information to the vehicle driver mobile device.

6. The system of claim 1, wherein the schedule is optimized based on optimization selected from the following list:
   minimum time from pickup to delivery of each order;
   average time from pickup to delivery of a group of orders;
   shortest distance traveled by each driver;
   average distance traveled by a group of drivers;
   earliest pickup time of each order;
   average pickup time of a group of orders;
   earliest delivery time of each order;
   average delivery time of a group of orders; and
   maximization of number of deliveries made without another pickup.

7. The system of claim 1, wherein the data graph is a weighted graph.

8. The system of claim 1, wherein the data graph is a directed graph.

* * * * *